United States Patent
Autio et al.

(10) Patent No.: US 7,325,721 B2
(45) Date of Patent: Feb. 5, 2008

(54) COMPUTER-IMPLEMENTED METHOD AND SYSTEM FOR GROUPING RECEIPTS

(75) Inventors: Dale Autio, Livonia, MI (US); Stephen Farrell, Basildon (GB); Phillip Simonte, Beverly Hills, MI (US)

(73) Assignee: Ford Motor Company, Dearborn, MI (US)

( * ) Notice: Subject to any disclaimer, the term of this patent is extended or adjusted under 35 U.S.C. 154(b) by 323 days.

(21) Appl. No.: 11/103,710

(22) Filed: Apr. 12, 2005
(Under 37 CFR 1.47)

(65) Prior Publication Data

US 2006/0253348 A1 Nov. 9, 2006

(51) Int. Cl.
*G06Q 40/00* (2006.01)

(52) U.S. Cl. ............... 235/379; 705/30; 705/40

(58) Field of Classification Search ......... 235/380; 705/26, 30, 35, 39, 40
See application file for complete search history.

(56) References Cited

U.S. PATENT DOCUMENTS

| | | | |
|---|---|---|---|
| 4,803,795 A * | 2/1989 | Questel et al. ............ 40/124.2 |
| 5,222,018 A | 6/1993 | Sharpe et al. |
| 5,684,965 A | 11/1997 | Pickering |
| 5,739,512 A * | 4/1998 | Tognazzini ................ 235/380 |
| 6,041,312 A | 3/2000 | Bickerton et al. |
| 7,158,948 B1 * | 1/2007 | Rodriguez et al. ........... 705/28 |
| 2001/0029484 A1 * | 10/2001 | Schultz et al. .............. 705/39 |
| 2002/0046162 A1 | 4/2002 | Sakashita et al. |
| 2002/0082990 A1 | 6/2002 | Jones |
| 2002/0120570 A1 | 8/2002 | Loy |
| 2002/0143674 A1 | 10/2002 | Beckman |
| 2003/0065573 A1 | 4/2003 | Nagel et al. |
| 2003/0093373 A1 | 5/2003 | Smirnoff et al. |
| 2003/0171998 A1 | 9/2003 | Pujar et al. |
| 2003/0212617 A1 | 11/2003 | Stone et al. |
| 2003/0220855 A1 | 11/2003 | Lam et al. |
| 2004/0083134 A1 * | 4/2004 | Spero et al. ............... 705/16 |
| 2004/0193538 A1 * | 9/2004 | Raines ..................... 705/39 |
| 2005/0171825 A1 * | 8/2005 | Denton et al. ............. 705/8 |
| 2005/0216373 A1 * | 9/2005 | Weiss et al. ............... 705/28 |
| 2005/0220526 A1 * | 10/2005 | Meyers et al. ............ 400/693 |

OTHER PUBLICATIONS

"Re-engineering Utilities Payment Processing," *TMA Journal*, V16, N6, Nov./Dec. 1996, pp. 43-36.
"Streamlining the Accounts Payable Function with EDI," *Healthcare Financial Management*, V51, N1, Jan. 1997, pp. 64-67.
Computer compact disc entitled "Oracle Applications 11i" Documentation Library Release 11.5.1.

* cited by examiner

*Primary Examiner*—Daniel Hess
(74) *Attorney, Agent, or Firm*—Gary Smith; Brooks Kushman P.C.

(57) ABSTRACT

A computer-implemented method for summarizing receipts and grouping the receipts onto one or more invoices. The method includes receiving a number of receipts and a time period including a start date and an end date, summarizing the receipts in the number of receipts having an approval date in the time period to obtain a number of summarized receipts, and grouping the summarized receipts to obtain one or more grouped invoices based on two of a number of grouping rules, the number of grouping rules including grouping by supplier pay site code, grouping by payment currency, grouping by receipt number, to grouping by payment term, grouping by value date, grouping by invoice type, and grouping by tax rules.

20 Claims, 2 Drawing Sheets

COMPUTER-IMPLEMENTED METHOD AND SYSTEM FOR GROUPING RECEIPTS

BACKGROUND OF THE INVENTION

1. Field of the Invention

One aspect of the present invention generally related to a computer-implemented method and system for grouping receipts, and more specifically, to a computer-implemented method and system for grouping and summarizing receipts.

2. Background Art

In distributed enterprises, for example multi-national manufacturing companies, a multitude of invoices can be generated by suppliers for direct materials (i.e. production) and indirect materials (i.e. non-production). Because of the shear number of invoices being generated, it is often difficult for suppliers to reconcile invoice and remittance information. These difficulties in reconciling remittance information from within the supplier realm often necessitate not only all direct suppliers but also all indirect suppliers receiving electronic data exchange (EDI) remittance files. Another negative resulting from the vast number of generated invoices is that many business units continue to print paper invoices while processing the invoices. This has a cost implication for both the manufacturer and the supplier.

Oracle has introduced limited functionality to perform daily grouping and summaries of receipts solely for receipts created on a given day for a given supplier. These receipts can be grouped onto one invoice depending on currency, payment term and date the receipt is generated. This type of grouping and summarizing is not sufficient for many distributed enterprises.

The current level of summarization and grouping, as described above, does not meet the particular corporate business requirements globally. There is a need for greater flexibility within the system to accommodate the various local business guidelines within the self-billing environment, which is characterized by the purchaser generating billing on behalf of the supplier.

In light of the foregoing, what is needed is a computer-implemented method and system for grouping and/or summarizing receipts that reduces the amount of paper invoices and/or removes the necessity of transmitting EDI remittance files to the suppliers.

SUMMARY OF THE INVENTION

One aspect of the present invention is a computer-implemented method for grouping receipts. Another aspect of the present invention is a method for grouping and summarizing receipts.

According to a first embodiment of the present invention, a computer-implemented method for summarizing receipts and grouping the receipts onto one or more invoices. The method includes receiving a number of receipts and a time period including a start date and an end date, summarizing the receipts in the number of receipts having an approval date in the time period to obtain a number of summarized receipts, and grouping the summarized receipts to obtain one or more grouped invoices based on two of a number of grouping rules, the number of grouping rules including grouping by supplier pay site code, grouping by payment currency, grouping by receipt number, to grouping by payment term, grouping by value date, grouping by invoice type, and grouping by tax rules. In certain embodiments, the time period is one to thirty days, or longer or shorter. For example, the time period can be less than one day or greater than 30 days depending on the application of the present invention. The summarization step can be optional based on business unit. The grouping by payment currency can be determined by the purchase order currency and the supplier's bank account. The grouping rules can include grouping by supplier pay site code and grouping by payment currency. The method can further include validating the number of receipts. The method can further include tracking one or more receipts of the number of receipts that have a validation error. Each of the one or more grouped invoices can include one or more receipt lines. The method can further include displaying the one or more grouped invoices based on the packing slip number of each receipt line of each of the one or more grouped invoices. The method can further include generating a validation error receipt based on the number of receipts and time period. The validation error report can be a daily validation error report.

According to a second embodiment of the present invention, a computer-implemented system for summarizing receipts and grouping the receipts onto one or more invoices is disclosed. The system includes one or more computers configured to receive a number of receipts and a time period including a start date and an end date, summarize the receipts in the number of receipts having an approval date in the time period to obtain a number of summarized receipts, and group the summarized receipts to obtain one or more grouped invoices based on two of a number of grouping rules, the number of grouping rules including grouping by supplier pay site code, grouping by payment currency, grouping by receipt number, to grouping by payment term, grouping by value date, grouping by invoice type, and grouping by tax rules. In certain embodiments, the time period is one to thirty days, or longer or shorter. The summarization configuration can be optional based on business unit. The grouping by payment currency can be determined by the purchase order currency and the supplier's bank account.

According to third embodiment of the present invention, a computer-implemented apparatus for summarizing receipts and grouping the receipts onto one or more invoices is disclosed. The apparatus includes a means for receiving a number of receipts and a time period including a start date and an end date, a means for summarizing the receipts in the number of receipts having an approval date in the time period to obtain a number of summarized receipts and a means for grouping the summarized receipts to obtain one or more grouped invoices based on two of a number of grouping rules, the number of grouping rules including grouping by supplier pay site code, grouping by payment currency, grouping by receipt number, to grouping by payment term, grouping by value date, grouping by invoice type, and grouping by tax rules. In certain embodiments, the time period is one to thirty days, or longer or shorter. The means for summarizing can be optional based on business unit.

According to fourth embodiment of the present invention, a computer-implemented method for summarizing receipts and grouping the receipts onto one or more invoices is disclosed. The method includes receiving a number of receipts and a time period including a start date and an end date, summarizing the receipts in the number of receipts having an approval date in the time period to obtain a number of summarized receipts, and grouping the summarized receipts to obtain one or more grouped invoices based on the following grouping rules: grouping by supplier pay site code, grouping by payment currency, grouping by receipt number, to grouping by payment term, grouping by value date, grouping by invoice type, and grouping by tax rules. In certain embodiments, the time period is one to thirty days, or longer or shorter.

The above and other objects, features, and advantages of the present invention are readily apparent from the following detailed description of the best mode for carrying out the invention when taken in connection with the accompanying drawings.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompany drawings which:

DETAILED DESCRIPTION OF EMBODIMENTS OF THE PRESENT INVENTION

As required, detailed embodiments of the present invention are disclosed herein. However, it is to be understood that the disclosed embodiments are merely exemplary of the invention that may be embodied in various and alternative forms. Therefore, specific functional details described herein are not to be interpreted as limiting, but merely as a representative basis for the claims and/or as a representative basis for teaching one of ordinary skill in the art to variously employ the present invention.

Several terms are used throughout this detailed description. These terms can have the following meanings, although merely illustrative of the many meanings the terms may have according to one of ordinary skill in the art.

It should be understood that standard invoices can refer to an invoice generated through a settlement system to produce a payment to a supplier.

It should be understood that a manual standard invoice can refer to an invoice generated by key punching data into an invoice form.

It should be understood that a credit memo or invoice can refer to a negative amount invoice received from a supplier representing a credit for goods or services purchased.

It should be understood that debit memo or invoice can refer to negative amount invoice sent to notify a supplier of a credit recorded for goods or services purchased.

It should be understood that a manual debit can refer to a negative amount invoice created by key punching data into a form.

It should be understood that mixed invoice can refer to a standard or credit debit memo invoice for which both positive and negative amounts can be entered and both positive and negative matching can be performed.

It should be understood that an advanced shipment notice can refer to an electronic confirmation sent by the supplier to advise the manufacturer that goods and services have been provided.

It should be understood that a receipt can be generated once the advanced shipment notice has been received. Confirmation can be transmitted for each transaction goods/service that has been received by the manufacturer.

It should be understood that summarization can be the bringing together of segregated receipt lines, for a specified period of time, to help reduce the number of invoices generated. Summarized invoices can contain all the individual receipt lines that have been categorized through the grouping rules.

It should be understood that grouping rules can be the rules that specify how receipt lines should be segregated. The segregation of the receipt lines through the grouping rules could result in a higher number of invoices, summarization can help reduce the number of invoices produced.

It should be understood that ship from can identify the supplier's site from which the item or service is being shipped.

It should be understood that ship to can identify the location where an item or service is provided (delivered or shipped to).

It should be understood that bill from can identify the supplier's site where billing is done.

It should be understood that bill to can identify the location billing is sent to.

It should be understood that place of service supply can be the location where a service takes place.

It should be understood that tax call can be the process step that commences the tax engine decision process.

It should be understood that tax engine can refer to the generic term used to define the tax decision making process used by the present invention. Transaction taxes, based on geographical information, include, for example, sales tax, use tax, VAT, GST, PST.

It should be understood that domestic transaction can refer to a transaction that takes place within the borders of a given country.

It should be understood that a cross border transaction can refer to a transaction that takes place across the borders of at least two countries.

It should be understood that a retroactive price change can refer to a price change applied to an existing purchase order with an effective date in the past. Payments made at the original price for goods or services already received are adjusted based on the net difference to the new price.

It should be understood that a return to supplier (RTS) can refer to a process of returning items to a supplier and adjusting payment accordingly. Items can be returned for a number of reasons, for example, to facilitate the creation of the retroactive price change.

It should be understood that payment terms can define the period from the payment trigger point, determined in the delivery terms and the value date of the supplier payment. This can be displayed on the purchase order and from a contract with the supplier.

It should be understood that value date can be the date on which funds are due to be received by the supplier for settlement of transactions.

It should be understood that delivery terms can be the terms under which transfer of risk, division of costs and transportation agreements are defined. They also trigger the payment terms and the transfer of title.

Several acronyms are used throughout this detailed description. The following is a non-exhaustive identification of the acronyms used. BIFR refers to bill from site. BITO refers to bill to location. SHFR refers to ship from site. SHTO refers to ship to location. SBI refers to self-billing invoice. ERS refers to evaluated receipt settlement. ASN refers to advance shipment notice. POSS refers to place of service supply. RTS refers to return to supplier.

Figure 1:
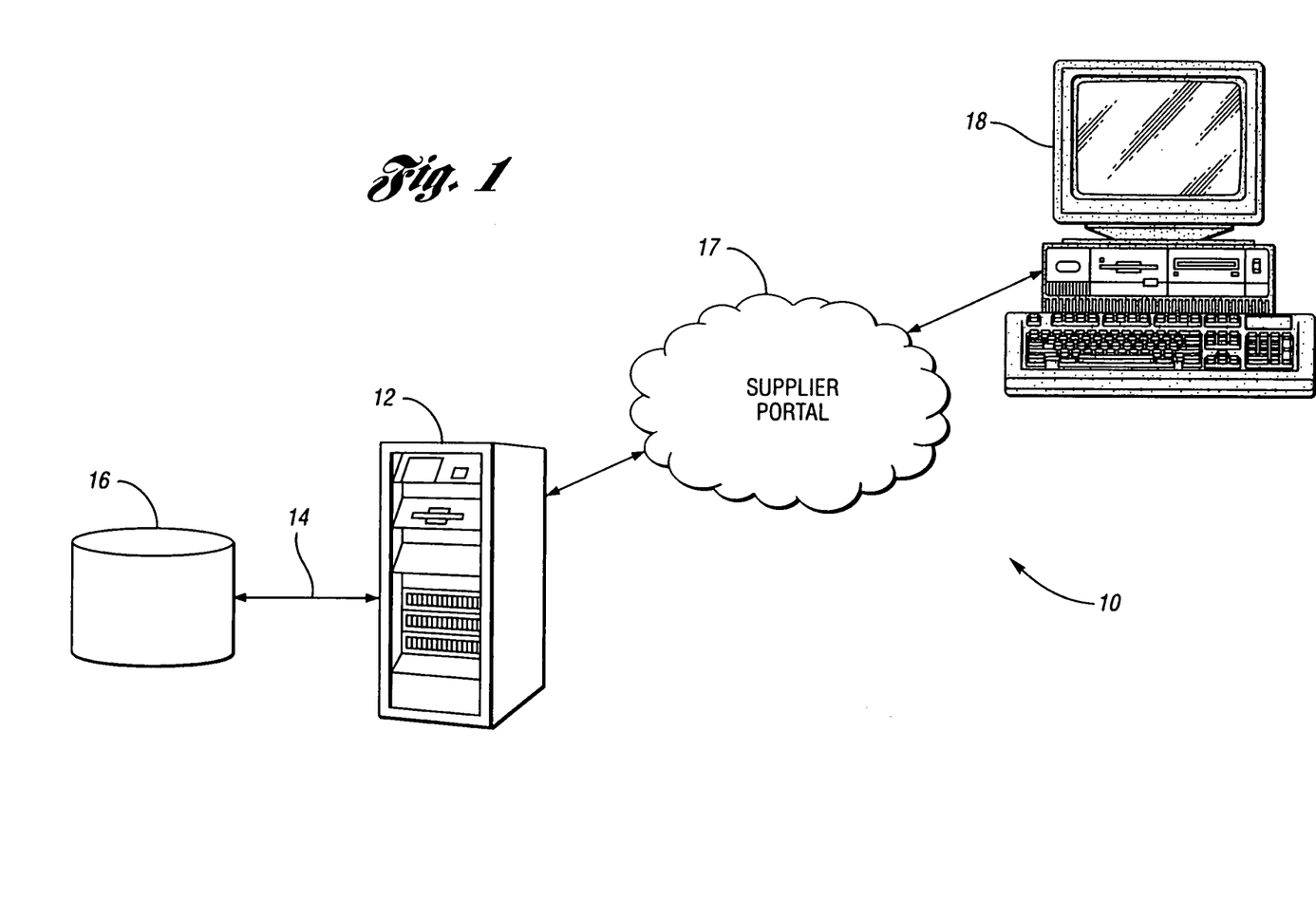
FIG. 1 is a block diagram of the system architecture of a system according to one embodiment of the present invention.

FIG. 1 is a block diagram illustrating overall system 10 for implementing one embodiment of the present invention. Overall system 10 includes central server 12, which is connected through communication line 14 to database 16. In certain embodiments, central server 12 contains a module for summarizing and grouping receipts, as provided by the present invention. Central server 12 is also connected via communication lines, for example the Internet 17, otherwise referred to as the supplier portal, to client computer 18, which can be used by users for viewing summarized and grouped receipts and preparing reports of the grouped and summarized receipts. It is understood that computer 18 can transmit data, mainly advanced shipping notices (ASNs) to database 16 through central server 12 and communication line 14. Central server 12, database 16, and computer 18 can be interconnected to a network, for example a local area network (LAN) or a wide area network (WAN), through a variety of interfaces, including, but not limited to dial-in connections, cable modems, high-speed lines, and hybrids thereof.

According to the embodiment depicted in FIG. 1, computer 18 and central server 12 support TCP/IP protocol which has input and access capabilities via two-way communication lines. Central server 12 includes a storage module for storing information to database 16 and a retrieval module for retrieving data stored in database 16.

The communication lines included in computer system 10 can be an intranet-adaptable communication line, for example, a dedicated line, a satellite link, an Ethernet link, a public telephone network, a private telephone network, and hybrids thereof. The communication lines can also be Intranet-adaptable. Examples of suitable communication lines include, but are not limited to, public telephone networks, public cable networks, and hybrids thereof. It is understood that one or more firewalls can be provided between computer 18 and central server 12.

In certain embodiments, the present invention is applicable to address the creation of self bill invoices, for both direct and indirect material transactions, goods and service. In certain embodiments, the rules for summarizing and grouping receipts onto an invoice are described. The following is a non-limiting list (in no particular order) of transaction sources that can give rise to invoices that can be grouped and/or summarized in accordance with the present invention:

(1) payment on receipt
(2) return to supplier
(3) indirect retroactive
(4) invoice type for retro adjustments
(5) invoices created from legacy system receipts process
(6) negative lump sum
(7) created by recurring invoice The present invention includes summarization rules and related grouping rules for receipts, to support the generation of self bill invoices for both direct and indirect transactions.

The functionality for summarization and grouping rules provides for a single global ERS/SBI process that accommodates the various business guidelines.

The present invention provides each business unit with the flexibility to apply summarization, specify the period for which summarization should be applied and determine which of the optional grouping rules will be applied.

In certain embodiments, the present invention provides functionality to enable summarization of all receipt lines, based on the receipt approval dates, over variable periods. The variable period can be from one to several days. In other embodiments, the time period can be less than one day or greater than seven days depending on the application of the present invention.

A variable period for seven days can be described as follows: (1) summarization of all approved receipt lines over the period of a week; (2) an extra run, coinciding with but before the month end general ledger process, to summarize approved receipt lines in the system up to and including the last day of the month; this will ensure that all approved receipt lines, that have been validated, are invoiced and posted to the general ledger in the current month regardless of receipt date and that invoices, where possible, only have receipt lines approved in the same month; and (3) due to the month end process above, the first summarization period in the following month could be for less than a whole week.

Figure 2:
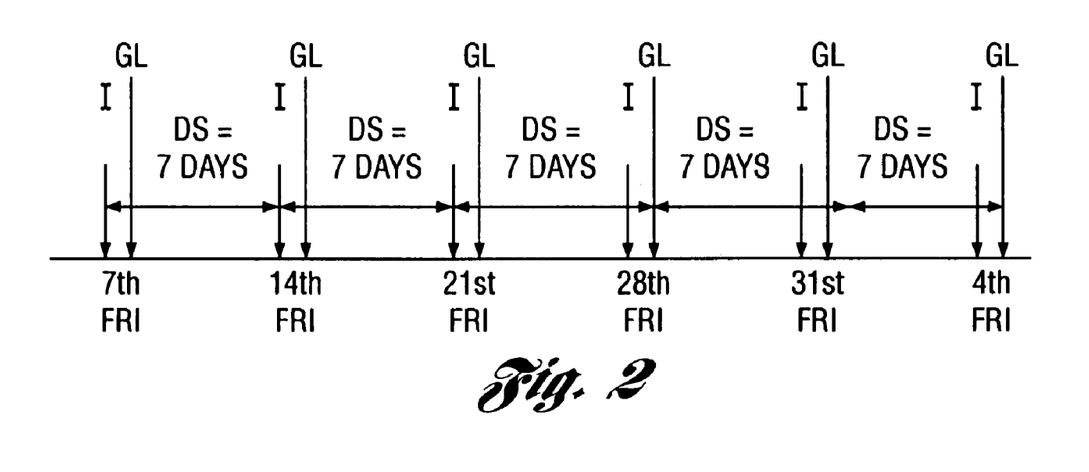
FIG. 2 shows the daily summarization process taking place with invoice generating occurring only on the Friday according to one embodiment of the present invention.

FIG. 2 shows the daily summarization process taking place with invoice generating occurring only on the Friday. Month end means that invoice generation also has to take place the following Monday, giving summarized receipts for only three days. This means that the following Friday invoices will be created with receipts for four days.

The value DS equals daily summarization minus summarization occurring on a daily basis. I equals invoice generation taking place at the end of the summarization period. GL equals invoice information feed to general ledger.

In certain embodiments, there is functionality for summarization to be optional by business unit. For business units that are not be subject to summarization, grouping can be applied on a daily basis and may segregate receipt lines to multiple invoices.

In certain embodiments, there is an ability to identify all receipt lines with errors, special flags or requiring immediate payments on a daily basis. These receipts can be placed on hold so that they are not subsequently included on an invoice.

In certain embodiments, if a purchase order is under revision and is therefore in a status of unapproved, at the point of invoice generation a match process can identify the fact that the receipts relate to the purchase order when it was in a state of approval. Therefore, the invoice is not placed on hold pending the purchase order reapproval.

Summarization of receipts over a variable period, as described above, provides for the reduction of the number invoices generated within a computer system. In certain embodiments, the present invention provides a supplier portal that contains manageable supplier data. Applying the grouping rules could result in more invoices being generated. As a result, summarizing all corresponding receipt lines onto an invoice will reduce the volumes. The present invention also removes the need for European suppliers to receive an EDI remittance file. The present invention also reduces the volumes of paper printed.

In certain embodiments, before the invoice generation process can take place, the receipt lines are passed through a series of rules that determine which lines can be summarized onto which invoice. These rules are referred to as grouping rules. Whilst the majority of the rules are applicable to all business units, some can be optional, depending on the legal and the local business operating environment. The guidelines for summarization and grouping can be as follows: (1) summarization and grouping rules are business unit specific; (2) a business unit can be subject to the summarization process only if grouping rules is applicable; (3) a business unit can be subject to grouping rules without the need for the summarization process being applicable; and (4) the ability to select which grouping rule(s) is applicable per business unit.

In certain embodiments, the prescribed grouping rules are as follows, in this particular order:

(1) group receipt lines by supplier pay site code;
(2) group receipt lines by payment currency;
(3) group receipt lines by receipt number;
(4) group receipt lines by payment term;
(5) group receipt lines by value date;
(6) group receipt lines by invoice type; and
(7) group receipt lines by tax rules.

In certain embodiments, grouping rule (1) refers to grouping receipt lines by supplier pay site code. In certain embodiments, this rule is mandatory for all business units. All receipt lines received for a given supplier pay site, i.e. bill from supplier, are grouped together.

In certain embodiments, grouping rule (2) refers to grouping receipt lines by payment currency. In certain embodiments, this rule is mandatory for all business units. To decrease the occurrences of large bank charges when paying suppliers, distributed enterprises typically utilize a local Automated Clearing House (ACH) banking system. Hence, the enterprise has one bank account per currency that is used by all business units regardless of location. The determinant of which bank account is used is the purchase order currency and the location of the supplier's bank account. The currency grouping, therefore, is determined by the purchase order currency and the location of the supplier's bank account to which payment will be made. For example, a German entity is paying a German supplier in Euros but whose bank account is located in France. To ensure that minimum charges are incurred, the payment must be made from the French Euro bank account rather than the German Euro bank account.

In certain embodiments, grouping rule (3) refers to grouping receipt lines by receipt number. In certain embodiments, this rule is optional by business unit. All lines on a receipt will be collected together to create an invoice.

In certain embodiments, grouping rule (4) refers to grouping receipt lines by purchase order payment terms. In certain embodiments, this rule is mandatory for all business units. All receipts with the same payment term for the same supplier site can be grouped together.

In certain embodiments, grouping rule (5) refers to grouping receipt lines by payment value date. In certain embodiments, this rule is mandatory for all business units. The value date, or payment due date, is determined by the payment term and the delivery term applicable to the purchase order. All receipt lines received for a given supplier pay site are grouped to ensure all invoice lines are for the same value date. This rule allows the distributed enterprise to avoid any subsequent late penalty charges. In order to correctly calculate the value date, the receipt and shipment dates recorded within the system must be accurate. One aspect of the present invention is functionality that allows the user to take into account weekends and public holidays relating to the bill to business unit, when the ability to link in with the calendars for other business units (remit to) is not available.

Another aspect of the present invention is functionality to identify receipt lines with a value date in the past or up to three days before invoice generation to enable immediate invoice generation once grouping has completed. If the value date is more than three days in the future, then the system awaits invoice generation. If the value date is three days or less in the future, then the system identifies the invoice for immediate invoice generation. If the value date becomes three days or less in the future, then the system identifies the invoice for immediate invoice generation.

Figure 3:
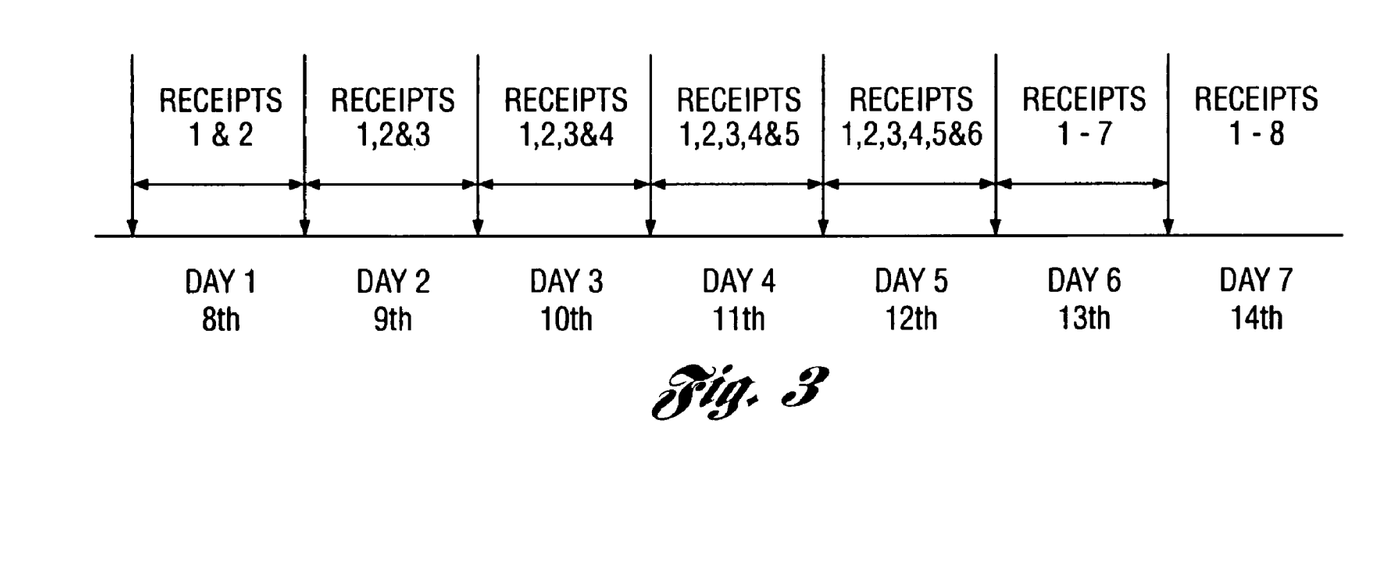
FIG. 3 shows an example of the timing of invoice generation based on value date according to one embodiment of the present invention.

FIG. 3 shows an example of the timing of invoice generation based on value date. Receipt line 1 received on day 1 has a payment due date of 23rd so invoice generation should take place on day 7, as scheduled. Receipt line 3 received on day 2 has a payment due date of 13th so invoice generation needs to take place immediately. Receipt line 2 received on day 1 has a payment due date of 13th but invoice generation will not take place until Day 2, when the value date becomes 5 days or less in the future.

In certain embodiments, grouping rule (6) refers to grouping receipt lines by invoice type. As summarization can consolidate all receipts received over a specified period, the present invention provides functionality to identify all receipt lines from different sources, to ensure they are either segregated or combined on to different invoices.

There can be legal requirements within certain countries, e.g. France, that stipulate that positive amounts and negative amounts should not be mixed on an invoice. For this reason, the present invention provides functionality that ensures that certain invoice types are not grouped on the same invoice.

Table 1 details how this segregation or consolidation should work. Each column shows a different group of segregated or consolidated invoice types, identified as A through E.

TABLE 1

| | Invoice Types | | | | |
|---|---|---|---|---|---|
| | A | B | C | D | E |
| IM Receipts | X | | | | |
| Recurring Payments | X | | | | |
| IM Returns | | X | | | |
| Direct Material Receipts (+) | X | | | | |
| Direct Material Receipts (−) | | X | | | |
| Tooling | X | | | | |
| Retro Pricing (Direct) | | | X | | |
| Prototypes | X | | | | |
| IM Retros (+) | | | | X | |
| IM RTS Retros (−) | | | | | X |
| Lump Sum (+) | X | | | | |
| Negative Lump Sum(−) | | X | | | |

As shown on Table 1, all positive receipt lines received within the specified period and fulfilling the other grouping criteria can be placed on the same invoice. All negative receipt lines received within the specified period and fulfilling the other grouping criteria can be grouped together.

In certain embodiments, the only invoice type for which this consolidation process is not applicable is the retro transactions. This grouping rule should be used to ensure that retro invoice types are placed on their own invoices. The positive retro lines received for the specified period can be consolidated on to a standard retro invoices, whilst the negative lines received for the specified period should be consolidate on a credit invoices (this is for the direct material retro process). For the indirect material retro process, all stage 1 RTS retros received within the specified period should be grouped together, whilst the stage 2 standard retros received for the same period should be grouped together on a standard retro invoice.

In certain embodiments, grouping rule (7) refers to grouping receipt lines by tax rules. Due to VAT legislation, the present invention includes functionality to display Self Bill Invoices (SBIs) within the correct VAT Registration Numbers based on the tax decision. A separate invoice can be generated for each receipt line item when any of these parameters differ: ship from, bill from, ship to, bill to, POSS in respect of the VAT Registration Number. This rule is optional, but can be activated for all business units using EVAT and summarization.

Another aspect of the present invention is the application of daily validation application to receipts and invoices generated.

One of the consequences of summarizing receipt lines over a variable period is the fact that an invoice may not always be generated on a daily basis. Receipt lines that have an error, requiring 4-way matching etc. could, therefore be held for some time, before invoice generation. The subsequent error or hold placed on the invoice could then delay payment to the supplier even more. Furthermore, as a result of summarization the invoice could contain multiple lines that would all be placed on hold pending the resolution of the error against the one line.

Therefore, the present invention includes functionality to carry out a validation process on a daily basis, to identify any receipt lines that could create an error, or place an invoice on hold, so that action can be taken prior to invoice generation. It is also an opportunity for errors to be identified before they are passed into the open interface and become an issue on a generated invoice. The functionality is for notifications to be sent to the appropriate person, best suited to resolving the errors.

The error line should be checked each day, to see if the error, flag etc. has been rectified. If it has, it should be included with the other lines at the time of invoice generation. If the error or flag has not been resolved then it needs to be kept out of the invoice generation process. Functionality is provided to track all receipt lines with outstanding validation errors.

In certain embodiments, in order to track the receipt lines that have validation errors, the following reports can be generated. A daily validation error report can be generated on a daily basis for each business unit. In certain embodiments, this report details, per supplier, each receipt line item that failed validation and the grouping rule that caused the failure. A weekly validation error report can be generated on a weekly basis for each business unit. In certain embodiments, this report details, per supplier, each receipt line item that failed validation and therefore could not be included within the invoice generation process. Details of the grouping rule that caused the failure also need to be displayed. An aging validation error report can be generated on an adhoc basis for each business unit. In certain embodiments, this report details, per supplier, each receipt line item that failed validation and therefore has not been included in the invoice generation process. It can detail the grouping rule that caused the failure and the length of time the issue has been outstanding.

According to an embodiment of the present invention, in order to provide that all line items on a receipt are grouped correctly on to an invoice, the following rules in this particular order can be applied:

(1) Receipt lines are grouped by supplier pay site code.
(2) Receipt lines are grouped by purchase order currency. Transaction lines grouped through rule (1) are grouped based on the purchase order currency code selected. Each receipt line with the same purchase order currency code is grouped together.
(3) Receipt lines are grouped by Receipt number.
(4) Receipt lines are grouped by payment term.
(5) Receipt lines need to be grouped by value date, to ensure that only receipt lines with the same value date are placed on to an invoice. Transaction lines grouped through rule 1 are grouped based on the period within which they are due to be paid. Transaction lines due to be paid immediately, due to an aged receipt, are grouped together. Transaction lines due to be paid on the 3rd of the month are also grouped together. Transaction lines due to be paid on the 13th of the month are also grouped together. Transaction lines due to be paid on the 23rd of the month are also grouped together.
(6) Receipt lines are grouped depending on the source of the receipt, e.g., if from indirect material receipts or direct material retros. The following bulleted list shows an example of how this grouping takes place.
  (1) create a standard invoice for indirect material receipts.
  (2) create a debit memo for indirect material RTS.
  (3) create a direct standard retro invoice for retro pricing (direct).
  (4) create an indirect standard retro invoice for ERS retro (indirect).
  (5) create a debit memo for RTS retro (indirect).
  (6) create a standard invoice for direct material standard (+).
  (7) create a debit memo for direct material returns (−).
  (8) create a standard invoice for lump sum (+).
  (9) create a standard invoice for negative lump sum (−).
  (10) create a standard invoice for tooling.
  (11) create a standard invoice for prototypes.
(7) Transaction lines are grouped according to Tax Rules. If the BIFR tax registration numbers are different then all transaction lines with the same BIFR tax registration numbers are grouped together. If the BITO Tax Registration numbers are different, then all transaction lines with the same BITO tax registration numbers need to be grouped together. If the SHFR tax registration numbers are different, then all transaction lines with the same SHFR tax registration numbers need to be grouped together. If the SHTO tax registration numbers are different, then all transaction lines with the same SHTO tax registration numbers need to be grouped together. If the POSS tax registration numbers are different, then all transaction lines with the same POSS tax registration numbers need to be grouped together. The grouped receipt lines can then be used to produce summarized invoices, in accordance with their grouping.

The following example details how receipt lines received on a given day would be treated through the grouping rules. The example in Table 2 relates to business unit 6624, i.e. Great Britain.

TABLE 2

Daily Summarization

| Number | Receipt | | | | Transaction Grouping |
| --- | --- | --- | --- | --- | --- |
| | Line 1 | Line 2 | Line 3 | Line 4 | |
| 1. | AA123 | AA123 | AA123 | AA123 | 102 |
| 2. | AA124 | AA124 | | | 102 |
| 3. | AA125 | AA125 | AA125 | AA125 | 102 |
| 4. | AA126 | AA126 | AA126 | | 102 |

TABLE 2-continued

Daily Summarization

| | Receipt | | | | Transaction |
|---|---|---|---|---|---|
| Number | Line 1 | Line 2 | Line 3 | Line 4 | Grouping |
| 5. | AA127 | | | | 102 |
| 6. | AA125 | AA125 | AA125 | AA125 | 102 |
| 7. | AA124 | AA124 | AA124 | AA124 | 102 |
| 8. | AA126 | | | | 102 |
| 9. | AA128 | AA128 | AA128 | | 102 |
| 10. | AA123 | AA123 | AA123 | AA123 | 102 |

According to this example, the pool of receipt lines (transaction grouping 102) is subject to the first grouping rule. Receipt lines are grouped together depending on the supplier pay site code, giving six transaction groupings, as depicted in Table 3.

TABLE 3

| Transaction Grouping | Line1 | Line2 | Line3 | Line4 | Line5 | Line6 | Line7 | Line8 | Transaction Grouping |
|---|---|---|---|---|---|---|---|---|---|
| 102 | AA123 | AA123 | AA123 | AA123 | AA123 | AA123 | AA123 | AA123 | 102 |
| 102 | AA124 | AA124 | AA124 | AA124 | AA124 | AA124 | | | 105 |
| 102 | AA125 | AA125 | AA125 | AA125 | AA125 | AA125 | AA125 | AA125 | 103 |
| 102 | AA126 | AA126 | AA126 | AA126 | | | | | 101 |
| 102 | AA127 | | | | | | | | 100 |
| 102 | AA128 | AA128 | AA128 | | | | | | 104 |

The six transaction groupings are consolidated, depending on the purchase order currency, as depicted in Table 4.

TABLE 4

| Supplier Pay Cite | Transaction Grouping | Number of Lines | Currency | Transaction Grouping |
|---|---|---|---|---|
| AA123 | 102 | 8 | GBP | 102 |
| AA124 | 105 | 6 | GBP | 105 |
| AA125 | 103 | 8 | GBP | 103 |
| AA126 | 101 | 3 | GBP | 101 |
| AA127 | 100 | 1 | GBP | 100 |
| AA128 | 104 | 3 | GBP | 104 |
| AA126 | 101 | 1 | EUR | 106 |

In the above example, out of the four receipt lines received for supplier pay site AA126, one has a currency of EUR, so it is separated from the other three lines.

Grouping rule 3, i.e. grouping by receipt number, is not applicable to this example.

Next, grouping rule 4, i.e. grouping by payment terms is performed. In this example, transaction group 103 is split as 7 receipts have European Standard terms (EST) and one has net instant as the payment term, as depicted in Table 5. The payment term for this receipt line would be changed by the buyer on the purchase order and approved through the purchasing hierarchy.

Although all 8 receipts could have the same value date (net instant only just received) the receipt lines should be split to ensure SBIs are not produced with receipts that have different payment terms.

TABLE 5

| Supplier Pay Site | Transaction Grouping | Number of Lines | Payment Term | Transaction Grouping |
|---|---|---|---|---|
| AA123 | 102 | 8 | EST | 102 |
| AA124 | 105 | 6 | EST | 105 |
| AA125 | 103 | 7 | EST | 103 |
| AA125 | 103 | 1 | Net Instant | 107 |
| AA126 | 101 | 3 | EST | 101 |
| AA127 | 100 | 1 | EST | 100 |
| AA128 | 104 | 3 | EST | 104 |
| AA126 | 106 | 1 | EST | 106 |

Next, grouping rule 5, i.e. grouping by value date is performed. Eight transaction groupings are grouped together, depending on the value date, giving nine transaction groups, as depicted in Table 6.

TABLE 6

| Supplier Pay Site | Transaction Grouping | Number of Lines | Value Date | Transaction Grouping |
|---|---|---|---|---|
| AA123 | 102 | 4 | $3^{rd}$ | 102 |
| AA124 | 105 | 6 | $13^{th}$ | 105 |
| AA125 | 103 | 7 | $23^{rd}$ | 103 |
| AA125 | 107 | 1 | $23^{rd}$ | 107 |
| AA126 | 101 | 3 | $3^{rd}$ | 101 |
| AA127 | 100 | 1 | $13^{th}$ | 100 |
| AA128 | 104 | 3 | $23^{rd}$ | 104 |
| AA126 | 106 | 1 | $23^{rd}$ | 106 |
| AA123 | 102 | 4 | $13^{th}$ | 108 |

In the above example, transaction group 102 is split, as four of the lines need to be paid on the $13^{th}$, whilst the other four need to be paid on $3^{rd}$ of the month.

Next, grouping rule 6, i.e. invoice type grouping is performed. The nine transaction groups are then split, depending on the document type they will be generating, as depicted in Table 7.

TABLE 7

| Supplier Pay Site | Transaction Grouping | Number of Lines | Document Type | Transaction Grouping |
|---|---|---|---|---|
| AA123 | 102 | 4 | ERS Standard | 102 |
| AA124 | 105 | 6 | ERS Standard | 105 |
| AA125 | 103 | 7 | ERS Standard | 103 |
| AA125 | 107 | 1 | ERS Standard | 107 |
| AA126 | 101 | 3 | ERS Standard | 101 |

TABLE 7-continued

| Supplier Pay Site | Transaction Grouping | Number of Lines | Document Type | Transaction Grouping |
|---|---|---|---|---|
| AA127 | 100 | 1 | ERS Standard | 100 |
| AA128 | 104 | 1 | ERS Standard | 104 |
| AA128 | 104 | 1 | Negative Lump Sum (Positive) | 104 |
| AA128 | 104 | 1 | RTS Standard | 109 |
| AA126 | 106 | 1 | ERS Standard | 106 |
| AA123 | 102 | 4 | ERS Standard | 108 |

In the above example, transaction 104 contains three lines, one an RST, which creates transaction grouping 109. The other two lines are a standard ERS and a positive negative lump sum transaction; these are left together as grouping 104.

Next, grouping rules 7, i.e. tax rules is performed. The eleven transaction groupings are grouped together depending on tax rules, giving 14 transaction groupings, as depicted in Table 8.

TABLE 8

| Supplier Pay Site | Transaction Grouping | Line No | Ship To | Ship From | Bill To | Bill From | POSS | Transaction Grouping |
|---|---|---|---|---|---|---|---|---|
| | | | | VAT Registration Number | | | | |
| AA123 | 102 | 1 | GB | GB | GB | GB | N/A | 102 |
| AA123 | 102 | 2 | GB | GB | GB | GB | GB | 110 |
| AA123 | 102 | 3-4 | DM | GB | GB | GB | N/A | 111 |
| AA123 | 108 | 4 | GB | GB | GB | GB | N/A | 108 |
| AA124 | 105 | 5-6 | GB | FR | GB | DM | N/A | 105 |
| AA125 | 103 | 1-7 | GB | DM | GB | GB | N/A | 103 |
| AA125 | 107 | 1 | GB | DM | GB | GB | N/A | 107 |
| AA126 | 101 | 1-3 | GB | GB | GB | GB | N/A | 101 |
| AA126 | 106 | 1 | GB | GB | GB | GB | N/A | 106 |
| AA127 | 100 | 1 | GB | FR | GB | DM | N/A | 100 |
| AA128 | 104 | 1-2 | GB | FR | GB | DM | N/A | 104 |
| AA128 | 109 | 3 | GB | FR | GB | DM | N/A | 109 |
| AA124 | 105 | 1-2 | ES | GB | GB | ES | N/A | 112 |
| AA124 | 105 | 3-4 | FR | GB | GB | ES | N/A | 113 |

In the above example transaction grouping 102, and 105 are split, as they contain transaction lines with different tax registration numbers.

The SBI can display receipt lines in the following order: (1) packing slip number; (2) receipt date; (3) shipment date; and (4) a receipt number.

Initially, the receipt lines can be displayed on the SBI in packing slip number order. If there is no packing slip associated to a receipt line, then it should appear on the SBI after all those that do have a packing slip number, and can be in receipt line date order.

The oldest receipt dates can be displayed first. If there is no packing slip or receipt date for any receipt lines they can appear in shipment date order.

The oldest shipment dates can be displayed first after those that do have a packing slip number or receipt date.

If any receipt lines do not have a packing slip number, receipt dates or shipment dates they can be displayed on the SBI in receipt number order, after any receipts that do have packing slip, receipt or shipment date.

The payment value date on which any transaction with a supplier is settled is calculated by taking a combination of the 'delivery terms' and 'payment terms' agreed with the supplier and displayed on the purchase order. This value date is then displayed on the self billing invoice, and payment should be made to the supplier on that date.

While the best mode for carrying out the invention has been described in detail, those familiar with the art to which this invention relates will recognize various alternative designs and embodiments for practicing the invention as defined by the following claims.

What is claimed is:

1. A computer-implemented method for summarizing receipts and grouping the receipts onto one or more invoices, the method comprising:

receiving a number of receipts and a time period including a start date and an end date;

summarizing the receipts in the number of receipts having an approval date in the time period to obtain a number of summarized receipts; and grouping the summarized receipts to obtain one or more grouped invoices based on two of a number of grouping rules, the number of grouping rules including grouping by supplier pay site code, grouping by payment currency, grouping by receipt number, to grouping by payment term, grouping by value date, grouping by invoice type, and grouping by tax rules, wherein the grouping by payment currency is determined by the purchase order currency and the supplier's bank account.

2. The method of claim 1 wherein the time period is one to thirty days.

3. The method of claim 1 wherein the summarization step is optional based on business unit.

4. The method of claim 1 wherein one of the two grouping rules is grouping by payment currency.

5. A computer-implemented method for summarizing receipts and grouping the receipts onto one or more invoices, the method comprising:

receiving a number of receipts and a time period including a start date and an end date;

summarizing the receipts in the number of receipts having an approval date in the time period to obtain a number of summarized receipts; and grouping the summarized receipts to obtain one or more grouped invoices based on two of a number of grouping rules, wherein the two of the number of grouping rules consists of grouping by supplier pay site code and grouping by payment currency.

6. A computer-implemented method for summarizing receipts and grouping the receipts onto one or more invoices, the method comprising:

receiving a number of receipts and a time period including a start date and an end date;

summarizing the receipts in the number of receipts having an approval date in the time period to obtain a number of summarized receipts;

grouping the summarized receipts to obtain one or more grouped invoices based on two of a number of grouping rules, the number of grouping rules including grouping by supplier pay site code, grouping by payment currency, grouping by receipt number, to grouping by payment term, grouping by value date, grouping by invoice type, and grouping by tax rules, wherein each of the one or more grouped invoices includes one or more receipt lines; and displaying the one or more grouped invoices based on the packing slip number of each receipt line of each of the one or more grouped invoices.

7. A computer-implemented system for summarizing receipts and grouping the receipts onto one or more invoices, the system including one or more computers, the one or more computers configured to:

receive a number of receipts and a time period including a start date and an end date;

summarize the receipts in the number of receipts having an approval date in the time period to obtain a number of summarized receipts; and group the summarized receipts to obtain one or more grouped invoices based on two of a number of grouping rules, the number of grouping rules including grouping by supplier pay site code, grouping by payment currency, grouping by receipt number, to grouping by payment term, grouping by value date, grouping by invoice type, and grouping by tax rules, wherein the grouping by payment currency is determined by the purchase order currency and the supplier's bank account.

8. The system of claim 7 wherein the time period is one to thirty days.

9. The system of claim 7 wherein the summarization configuration is optional based on business unit.

10. The system of claim 7 wherein one of the two grouping rules is grouping by payment currency.

11. A computer-implemented apparatus for summarizing receipts and grouping the receipts onto one or more invoices, the apparatus comprising:

means for receiving a number of receipts and a time period including a start date and an end date;

means for summarizing the receipts in the number of receipts having an approval date in the time period to obtain a number of summarized receipts; and means for grouping the summarized receipts to obtain one or more grouped invoices based on two of a number of grouping rules, the number of grouping rules including grouping by supplier pay site code, grouping by payment currency, grouping by receipt number, to grouping by payment term, grouping by value date, grouping by invoice type, and grouping by tax rules, wherein the grouping by payment currency is determined by the purchase order currency and the supplier's bank account.

12. The apparatus of claim 11 wherein the time period is one to thirty days.

13. The apparatus of claim 11 wherein the means for summarizing is optional based on business unit.

14. The apparatus of claim 11 wherein one of the two grouping rules is grouping by payment currency.

15. A computer-implemented method for summarizing receipts and grouping the receipts onto one or more invoices, the method comprising:

receiving a number of receipts and a time period including a start date and an end date;

summarizing the receipts in the number of receipts having an approval date in the time period to obtain a number of summarized receipts; and grouping the summarized receipts to obtain one or more grouped invoices based on the following grouping rules: grouping by supplier pay site code, grouping by payment currency, grouping by receipt number, to grouping by payment term, grouping by value date, grouping by invoice type, and grouping by tax rules.

16. The method of claim 15 wherein the time period is one to thirty days.

17. The method of claim 15 wherein the grouping by payment currency is determined by the purchase order currency and the supplier's bank account.

18. The method of claim 15 wherein the summarization step is optional based on business unit.

19. The method of claim 15 wherein each of the one or more grouped invoices includes one or more receipt lines.

20. The method of claim 19 further comprising displaying the one or more grouped invoices based on the packing slip number of each receipt line of each of the one or more grouped invoices.

* * * * *